(12) United States Patent
Falliere et al.

(10) Patent No.: US 8,613,094 B1
(45) Date of Patent: Dec. 17, 2013

(54) USING A HONEYPOT WORKFLOW FOR SOFTWARE REVIEW

(71) Applicant: Google Inc., Mountain View, CA (US)

(72) Inventors: Nico Falliere, Mountain View, CA (US); Richard Cannings, Mountain View, CA (US); Joseph Benjamin Gruver, Mountain View, CA (US); Jonathan Bruce Larimer, Mountain View, CA (US); Sebastian Johannes Porst, Mountain View, CA (US); Curtis Gerald Condra, Mountain View, CA (US); Adrian Ludwig, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/717,240

(22) Filed: Dec. 17, 2012

(51) Int. Cl.
  *G06F 11/00* (2006.01)
(52) U.S. Cl.
  USPC ............... 726/24; 726/22; 726/23; 726/25
(58) Field of Classification Search
  USPC ..................................... 726/22, 23, 24, 25
  See application file for complete search history.

(56) References Cited

U.S. PATENT DOCUMENTS

| | | | |
|---|---|---|---|
| 8,418,251 B1* | 4/2013 | Satish | 726/24 |
| 2006/0143707 A1 | 6/2006 | Song et al. | |
| 2007/0220479 A1* | 9/2007 | Hughes | 717/100 |
| 2007/0240215 A1 | 10/2007 | Flores et al. | |
| 2012/0136949 A1* | 5/2012 | Virani et al. | 709/206 |
| 2012/0246613 A1* | 9/2012 | Shukla et al. | 717/105 |

FOREIGN PATENT DOCUMENTS

CN 101741570 A 6/2010

OTHER PUBLICATIONS

Gérard Wagener, Self-Adaptive Honeypots Coercing and Assessing Attacker Behaviour, Dissertation, Jun. 22, 2011, pp. 1-177, Universite du Luxembourg, PhD-FSTC-2011-10, The Faculty of Science, Technology and Communication.

* cited by examiner

Primary Examiner — Teshome Hailu
(74) Attorney, Agent, or Firm — Morris & Kamlay LLP (57) ABSTRACT

An application distribution server may be operable to perform an application distribution process for an application, where the application distribution process may comprise a plurality of phases. The plurality of phases may comprise, in sequence, a developer account creation phase, a risk assessment phase, an application upload phase, an application publication phase, an application promotion phase and an application download phase. The application distribution server may detect, at each of the plurality of phases, whether a particular behavior corresponding to use of the application to distribute undesirable software may occur. In instances when an occurrence of the particular behavior is detected at a certain phase in the application distribution process, the application distribution server may continue, utilizing a trap system, one or more subsequent phases after the certain phase for the application, without communicating information on the detection of the occurrence of the particular behavior.

18 Claims, 4 Drawing Sheets

USING A HONEYPOT WORKFLOW FOR SOFTWARE REVIEW

FIELD

Certain embodiments of the disclosure relate to detection of malicious or undesirable software, such as malware. More specifically, certain embodiments of the disclosure relate to a method and system for using a honeypot workflow for software review.

BACKGROUND

An application distribution server may include a plurality of published applications which may be distributed to end-user devices such as, for example, smart phones, mobile phones, tablets and/or other data processing devices. Some developers of the applications may actually be attackers who may utilize the application distribution server as a way to distribute undesirable software. Undesirable software such as malware may be used or created to disrupt device operation, gather sensitive information and/or gain access to private data processing systems. The undesirable software may comprise, for example, viruses, worms, trojan horses, spyware, adware and/or other malicious programs.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Aspects of the present disclosure are directed to a method and system for using a honeypot workflow for software review. In various embodiments of the disclosure, an application distribution server may comprise a plurality of applications which may be downloaded and/or installed onto end-user devices such as, for example, smart phones, mobile phones and/or tablets. The application distribution server may perform an application distribution process for an application, where the application distribution process may comprise a plurality of phases. The application distribution server may detect, at each of the plurality of phases, whether a particular behavior corresponding to use of the application to distribute undesirable software may occur. In instances when an occurrence of the particular behavior is detected at a certain phase, the application distribution server may continue, utilizing a trap system, one or more subsequent phases in the application distribution process for the application, without communicating information on the detection of the particular behavior, for example, to an attacker associated with the application. In this regard, the plurality of phases may comprise, in sequence, a developer account creation phase, a risk assessment phase, an application upload phase, an application publication phase, an application promotion phase and an application download phase, for example.

Various advantages, aspects and novel features of the present disclosure, as well as details of an illustrated embodiment thereof, will be more fully understood from the following description and drawings.

DETAILED DESCRIPTION

Certain embodiments of the disclosure can be found in a method and system for using a honeypot workflow for software review. Certain specific details are set forth in the following description and in drawings to provide a thorough understanding of various embodiments of the disclosure. One skilled in the art, however, will understand that additional embodiments of the present disclosure may be practiced without several of the details described in the following description.

In various embodiments of the disclosure, an application distribution server may be operable to perform an application distribution process for an application, where the application distribution process may comprise a plurality of phases. For example, the plurality of phases in the application distribution process may comprise, in sequence, a developer account creation phase, a risk assessment phase, an application upload phase, an application publication phase, an application promotion phase and an application download phase. The application distribution server may be operable to detect, at each of the plurality of phases, whether a particular behavior corresponding to use of the application to distribute undesirable software may occur. In instances when an occurrence of the particular behavior is detected at a certain phase in the application distribution process, the application distribution server may be operable to continue, utilizing a trap system, one or more subsequent phases after the certain phase for the application, without communicating information on the detection of the occurrence of the particular behavior.

In an example embodiment of the disclosure, in instances when the occurrence of the particular behavior is detected at the risk assessment phase, the application distribution server may be operable to create a trap account for the application without account blocking, for example. In instances when the occurrence of the particular behavior is detected at the application upload phase and/or at a previous phase prior to the application upload phase, the application distribution server may be operable to mark the application, which may have been uploaded to the application distribution server, as a trap application without application suspension, for example. In instances when the occurrence of the particular behavior is detected at the application publication phase and/or at a previous phase prior to the application publication phase, the application distribution server may be operable to mark the application, which may have been published, as a trap application without application suspension, and prevent the published trap application from being downloaded onto an end-user device, for example. In instances when the occurrence of the particular behavior is detected at the application promotion phase and/or at a previous phase prior to the application promotion phase, the application distribution server may be operable to mark the application which may have been promoted as a trap application without application suspension, and prevent the promoted trap application from being installed in an end-user device, for example.

In an example embodiment of the disclosure, the application distribution server may be operable to allow installation of the promoted trap application, for example, in one or more trap end-user devices, where the one or more trap end-user devices may be created for running of the installed trap application. In such instances, the application distribution server may be operable to monitor traffic to the application distribution server based on the running of the installed trap application on the one or more trap end-user devices. The application distribution server may then be operable to determine, based on the monitoring, how the undesirable software may be attempted to be distributed.

Figure 1:
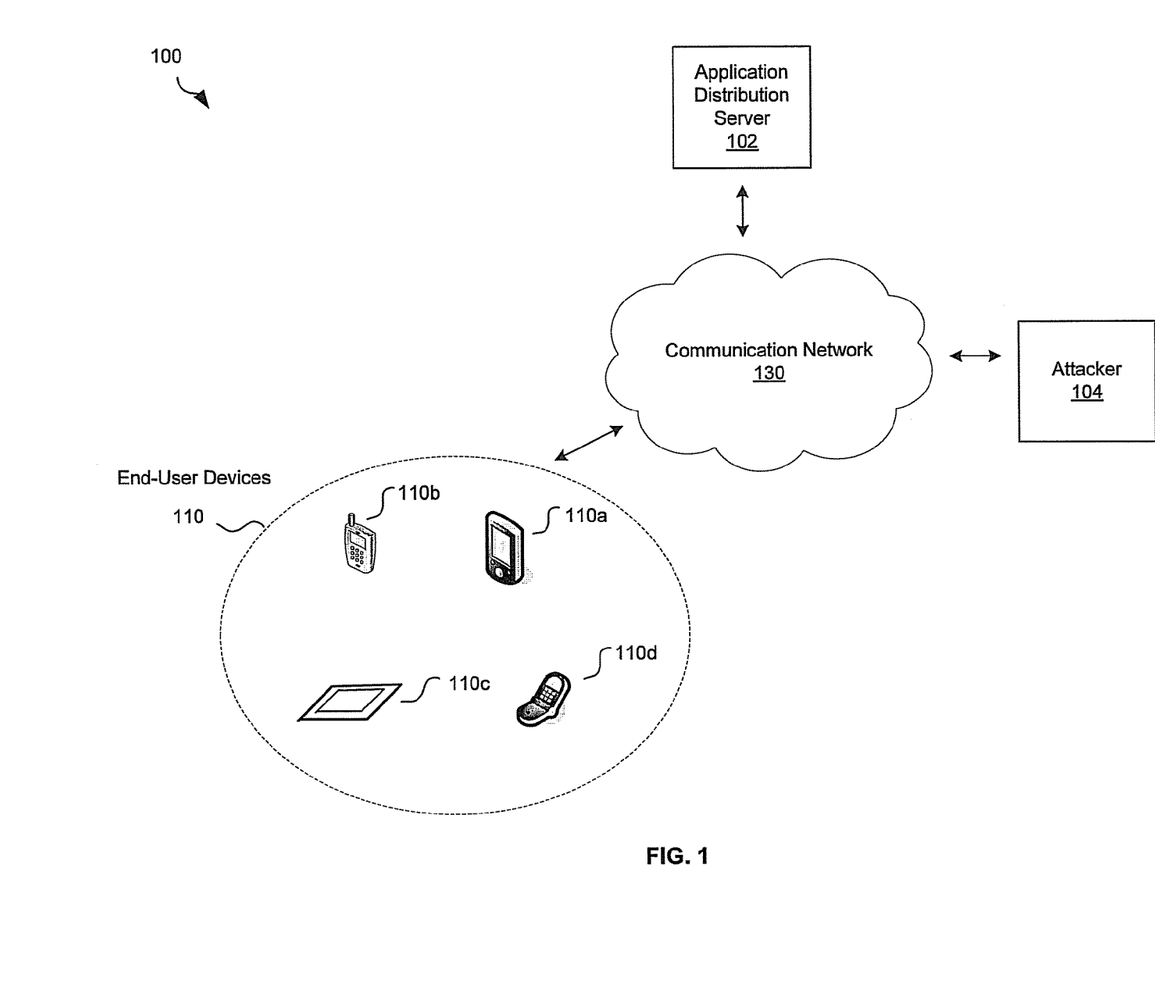
FIG. 1 is a block diagram illustrating an example communication system, in accordance with an embodiment of the disclosure.

FIG. 1 is a block diagram illustrating an example communication system, in accordance with an embodiment of the disclosure. Referring to FIG. 1, there is shown a communication system 100. The communication system 100 may comprise an application distribution server 102, a communication network 130 and a plurality of end-user devices 110, of which end-user devices 110a-110d are illustrated.

The application distribution server 102 may comprise suitable logic, circuitry, interfaces and/or code that may be operable to publish and/or distribute applications, for example, to the end-user devices 110. In an example embodiment of the disclosure, the application distribution server 102 may perform an application distribution process for distributing an application to one or more of the plurality of end-user devices 110. In this regard, the application distribution process may comprise a plurality of phases, such as, for example, a developer account creation phase, a risk assessment phase, an application upload phase, an application publication phase, an application promotion phase and an application download phase in sequence. The application distribution server 102 may be operable to detect, at each of the plurality of phases, whether a particular behavior corresponding to use of the application to distribute undesirable software may occur.

A trap system such as a honeypot may be a trap set which may be utilized to gather information about attackers such as an attacker 104 who may utilize the application distribution server 102 as a way to distribute undesirable software such as, for example, malware. In an example embodiment of the disclosure, the application distribution server 102 may be operable to utilize a trap or honeypot workflow for the malicious software review and/or detection in the multi-phase application distribution process.

Each of the end-user devices 110 such as the end-user device 110a may comprise suitable logic, circuitry, interfaces and/or code that may be operable to process data or signals. The end-user device 110a may be operable to communicate signals across the communication network 130. The end-user device 110a may comprise, for example, a smart phone, a mobile phone, a tablet and/or other similar type of data processing device. In an example embodiment of the disclosure, one or more applications may be downloaded onto and/or installed in the end-user device 110a from the application distribution server 102 via, for example, the communication network 130.

The communication network 130 may comprise suitable logic, circuitry, interfaces, devices and/or code that may be operable to provide data and voice communication services to various devices and/or entities by using various wireless and/or wired communication technologies. The communication network 130 may comprise, for example, the Internet, a cellular network and/or other multimedia network. In an example embodiment of the disclosure, the communication network 130 may be operable to provide communications among the application distribution server 102, the attacker 104 and/or the plurality of end-user devices 110a-110d.

In operation, the application distribution server 102 may be operable to perform an application distribution process for an application, where the application distribution process may comprise a plurality of phases. For example, the plurality of phases in the application distribution process may comprise, in sequence, a developer account creation phase, a risk assessment phase, an application upload phase, an application publication phase, an application promotion phase and an application download phase. At the application upload phase, the application may be uploaded to the application distribution server 102 via the communication network 130, for example. At the application download phase, the application may be downloaded from the application distribution server 102 onto an end-user device such as the end-user device 110a via the communication network 130, for example.

The application distribution server 102 may be operable to detect, at each of the plurality of phases, whether a particular behavior may occur, where the particular behavior may correspond to use of the application to distribute undesirable software such as malware, for example. In instances when an occurrence of the particular behavior is detected at a certain phase in the application distribution process, the application distribution server 102 may be operable to continue, utilizing a trap system such as a honeypot, one or more subsequent phases after the certain phase for the application, without communicating information on the detection of the occurrence of the particular behavior, for example, to the attacker 104 who may be associated with the application. In this regard, at each phase in the application distribution process, the application distribution server 102 does not provide the attacker 104 an ability to determine that a particular behavior (or bad behavior) has been detected by allowing a replica of later phases of the process using a trap system such as a honeypot. Thus, even once detected by the application distribution server 102, the attacker 104 may not observe that he or she is detected. The longer this deception may be maintained, more interesting signals of particular behavior may be produced by the attacker 104, thus more information on the particular behavior may be collected by the application distribution server 102 and more effective the application distribution server 102 may be at preventing undesirable software such as malware from getting to end-user devices 110a-110d.

In an example embodiment of the disclosure, in instances when the occurrence of the particular behavior is detected at the risk assessment phase, the application distribution server 102 may be operable to create a trap account for the application without account blocking, for example. In instances when the occurrence of the particular behavior is detected at the application upload phase and/or at a previous phase prior to the application upload phase, the application distribution server 102 may be operable to mark the application, which may have been uploaded to the application distribution server 102, as a trap application without application suspension, for example. In instances when the occurrence of the particular behavior is detected at the application publication phase and/or at a previous phase prior to the application publication phase, the application distribution server 102 may be operable to mark the application, which may have been published, as a trap application without application suspension, and prevent the published trap application from being downloaded onto an end-user device such as the end-user device 110a, for example. In instances when the occurrence of the particular behavior is detected at the application promotion phase and/or at a previous phase prior to the application promotion phase, the application distribution server 102 may be operable to mark the application which may have been promoted as a trap application without application suspension, and prevent the promoted trap application from being installed in an end-user device such as the end-user device 110a, for example. In this regard, while the trap application may be utilized to observe the attacker 104, the trap application may not actually be downloaded onto and/or installed in end-user devices 110a-110d.

In an example embodiment of the disclosure, the application distribution server 102 may be operable to allow installation of the promoted trap application, for example, in one or more trap end-user devices, where the one or more trap end-user devices may be created for the purpose of running the installed trap application. In such instances, the application distribution server 102 may be operable to monitor traffic to the application distribution server 102 based on the running of the installed trap application on the one or more trap end-user devices. The application distribution server 102 may then be operable to determine, based on the monitoring, how the undesirable software may be attempted to be distributed, for example.

Figure 2:
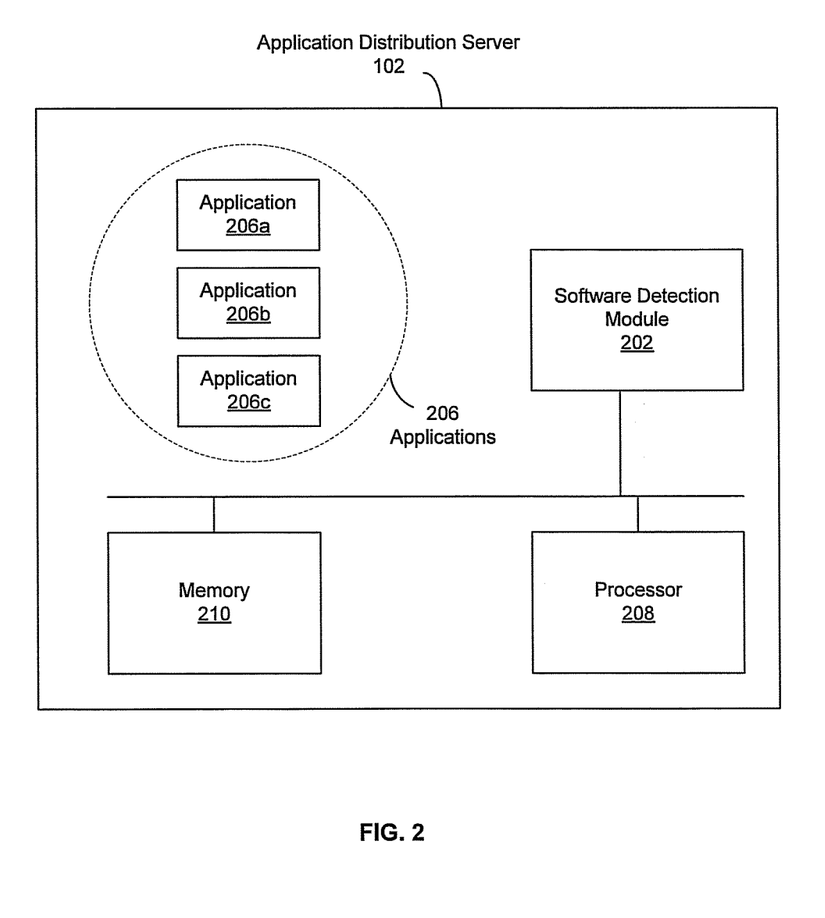
FIG. 2 is a block diagram illustrating an example application distribution server, in accordance with an embodiment of the disclosure.

FIG. 2 is a block diagram illustrating an example application distribution server, in accordance with an embodiment of the disclosure. Referring to FIG. 2, there is shown the application distribution server 102. The application distribution server 102 may comprise, for example, a software detection module 202, a processor 208 and a memory 210. The application distribution server 102 may comprise a plurality of applications 206, of which applications 206a-206c are illustrated. Each of the plurality of applications 206a-206d may be uploaded, published, promoted and/or downloaded onto an end-user device such as the end-user device 110a vie an application distribution process. The application distribution server 102 may be as described with respect to FIG. 1, for example.

The software detection module 202 may comprise suitable logic, circuitry, interfaces and/or code that may be operable to perform undesirable-software detection functions such as, for example, malware detection functions for the application distribution server 102. In an example embodiment of the disclosure, the software detection module 202 may be operable to detect, at each of a plurality of phases in the application distribution process, whether a particular behavior may occur, where the particular behavior may correspond to use of an application such as the application 206a to distribute undesirable software such as malware.

The processor 208 may comprise suitable logic, circuitry, interfaces and/or code that may be operable to manage and/or control operations of various components and/or modules in the application distribution server 102. The processor 208 may utilize an operating system (OS) that enables the execution of various applications such as, for example, the applications 206. In an example embodiment of the disclosure, the processor 208 may be operable to perform an application distribution process, for each of the applications 206a-206c, with a trap or honeypot workflow.

The memory 210 may comprise suitable logic, circuitry, interfaces and/or code that may be operable to store information such as executable instructions and/or data that may be utilized by the processor 208, the software detection module 202 and/or other modules or components in the application distribution server 102. The memory 210 may comprise RAM, ROM, low latency nonvolatile memory such as flash memory and/or other suitable electronic data storage.

In operation, the processor 208 in the application distribution server 102 may be operable to perform an application distribution process for an application such as the application 206a, where the application distribution process may comprise a plurality of phases, such as, for example, a developer account creation phase, a risk assessment phase, an application upload phase, an application publication phase, an application promotion phase and an application download phase in sequence. The software detection module 202 in the application distribution server 102 may be operable to detect, at each of the plurality of phases, whether a particular behavior may occur, where the particular behavior may correspond to use of the application 206a to distribute undesirable software such as malware, for example. In instances when an occurrence of the particular behavior is detected by the software detection module 202 at a certain phase in the application distribution process, the processor 208 may be operable to continue, utilizing a trap system such as a honeypot, one or more subsequent phases after the certain phase for the application 206a, without communicating information on the detection of the occurrence of the particular behavior, for example, to the attacker 104 who may be associated with the application 206a.

Figure 3:
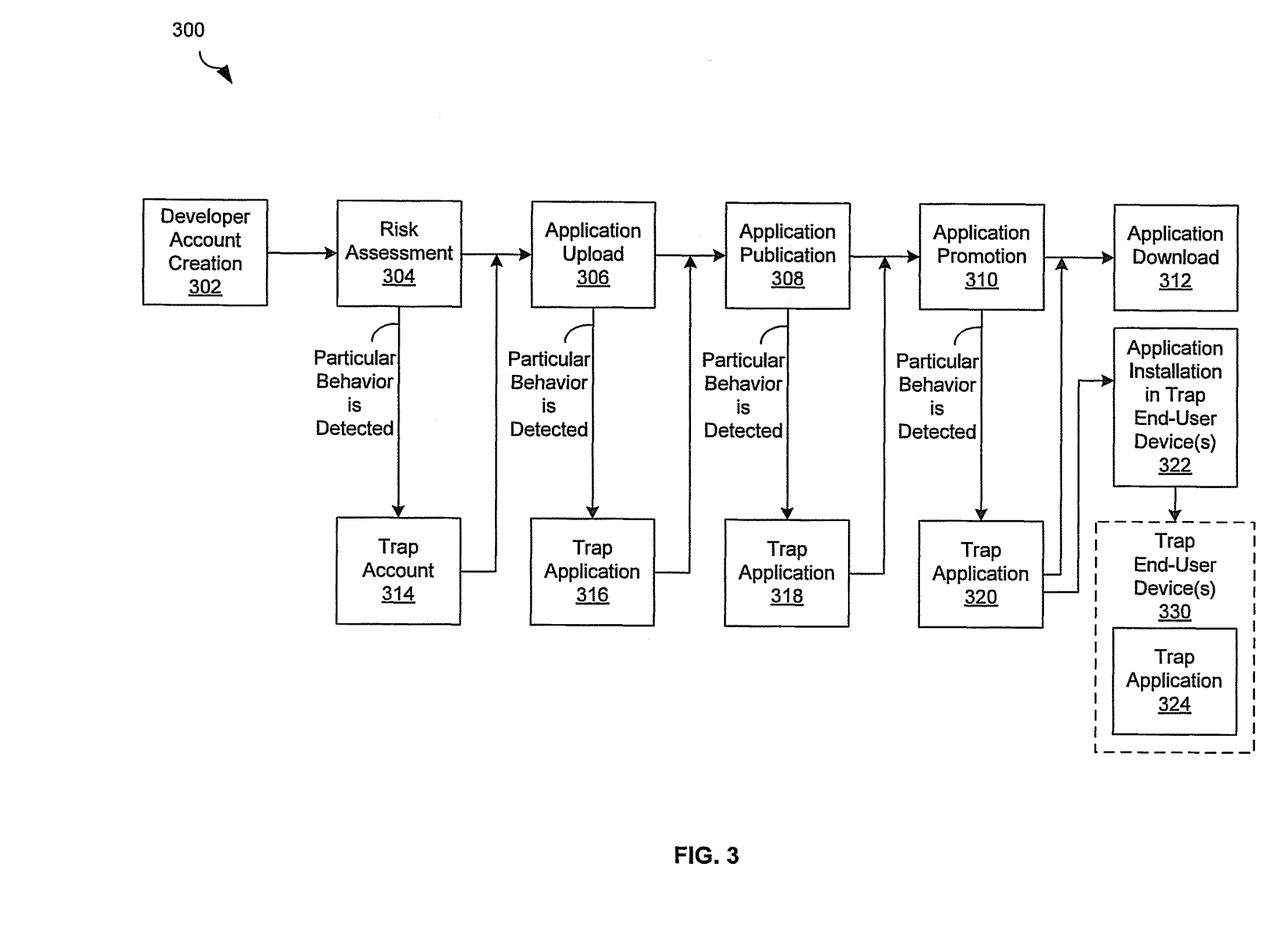
FIG. 3 is a block diagram illustrating an example application distribution process with a honeypot workflow, in accordance with an embodiment of the disclosure.

FIG. 3 is a block diagram illustrating an example application distribution process with a honeypot workflow, in accordance with an embodiment of the disclosure. Referring to FIG. 3, there is shown an application distribution process 300. The application distribution process 300 may comprise, in sequence, a developer account creation phase 302, a risk assessment phase 304, an application upload phase 306, an application publication phase 308, an application promotion phase 310 and an application download phase 312, for example.

In an example operation, the processor 208 in the application distribution server 102 may be operable to perform the application distribution process 300 for an application such as the application 206a. The processor 208 may be operable to create a developer account associated with the application 206a at the developer account creation phase 302. At the subsequent risk assessment phase 304, the processor 208 may be operable to perform risk analysis, for example, utilizing a risk engine, for one or more on-line transactions associated with the developer account. The processor 208 may communicate a result of the risk analysis to the software detection module 202 in the application distribution server 102. The software detection module 202 may be operable to detect whether a particular behavior may occur at the risk assessment phase 304, based on the result of the risk analysis. For example, the particular behavior at the risk assessment phase 304 may comprise using a particular or invalid credit card for the transaction, using a stolen credit card for the transaction and/or making the transaction not from a real human. In instances when an occurrence of the particular behavior is detected by the software detection module 202 at the risk assessment phase 304, instead of blocking or terminating the created account, the processor 208 may be operable to create a trap account 314 associated with the application 206a. The processor 208 may continue one or more subsequent phases utilizing the trap account 412. The trap account 314 may function like a regular account, except that the associated application 206a being distributed may be marked as a trap application.

At the subsequent application upload phase 306, the processor 208 may be operable to upload the application 206a to the application distribution server 102. The uploaded application 206a is not yet available to the end-user devices 110a-110d and is in an unpublished state. The software detection module 202 may be operable to detect whether a particular behavior may occur at the application upload phase 306. In instances when an occurrence of a particular behavior is detected by the software detection module 202 at the application upload phase 306 and/or at a previous phase prior to the application upload phase 306, instead of suspending the application 206a, the processor 208 may be operable to mark the application 206a, which may have been uploaded to the application distribution server 102, as a trap application 316, for example. The processor 208 would not mark the application 206a as "suspended" or otherwise indicate that the application 206a is known to be malicious. The processor 208 may continue one or more subsequent phases utilizing the trap application 316. In this regard, the particular behavior may comprise, for example, copying all existing images and sending the copied all existing images to the communication network 130, opening all contact information in a contact database and sending the opened all contact information to the communication network 130, and/or other similar type of behavior.

At the subsequent application publication phase 308, the processor 208 may be operable to publish the application 206a and make the application 206a available to the end-user devices 110a-110d. The software detection module 202 may be operable to detect whether the particular behavior may occur at the application publication phase 308. In instances when an occurrence of the particular behavior is detected by the software detection module 202 at the application publication phase 308 and/or at a previous phase prior to the application publication phase 308, instead of suspending the application 206a, the processor 208 may be operable to mark the application 206a, which may have been published, as a trap application 318, for example. The processor 208 may continue one or more subsequent phases utilizing the trap application 318. The processor 208 may also be operable to prevent the published trap application 318 from being downloaded onto an end-user device such as the end-user device 110a, for example. In this regard, from the perspective of the attacker 104, the trap application 318 may appear to have been published. In reality, the trap application 318 may not actually be downloaded onto any end-user device 110. This may be accomplished by, for example, causing any attempted download of the trap application 318 to be intentionally corrupted as though there was a network or caching problem.

At the subsequent application promotion phase 310, the processor 208 may be operable to promote the application 206a which has been published. The application 206a may be promoted, for example, utilizing advertisements, website links, and/or social networks. The software detection module 202 may be operable to detect whether the particular behavior may occur at the application promotion phase 310. In instances when an occurrence of the particular behavior is detected by the software detection module 202 at the application promotion phase 310 and/or at a previous phase prior to the application promotion phase 310, instead of suspending the application 206a, the processor 208 may be operable to mark the application 206a which may have been promoted as a trap application 320, for example. The processor 208 may continue one or more subsequent phases utilizing the trap application 320. The processor 208 may also be operable to prevent the promoted trap application 320 from being actually installed in an end-user device such as the end-user device 110a, In an example embodiment of the disclosure, the processor 208 may be operable to allow installation 322 of the promoted trap application 320, for example, in one or more trap end-user devices 330, where the one or more trap end-user devices 330 may be created for running of the installed trap application 324. In such instances, the software detection module 202 may be operable to monitor traffic to the application distribution server 102 based on the running of the installed trap application 324 on the one or more trap end-user devices 330. The software detection module 202 may then be operable to determine, based on the monitoring, how the undesirable software such as malware may be attempted to be distributed. For example, the software detection module 202 may detect use of advertisements and/or affiliated networks to drive traffic to undesirable software.

Figure 4:
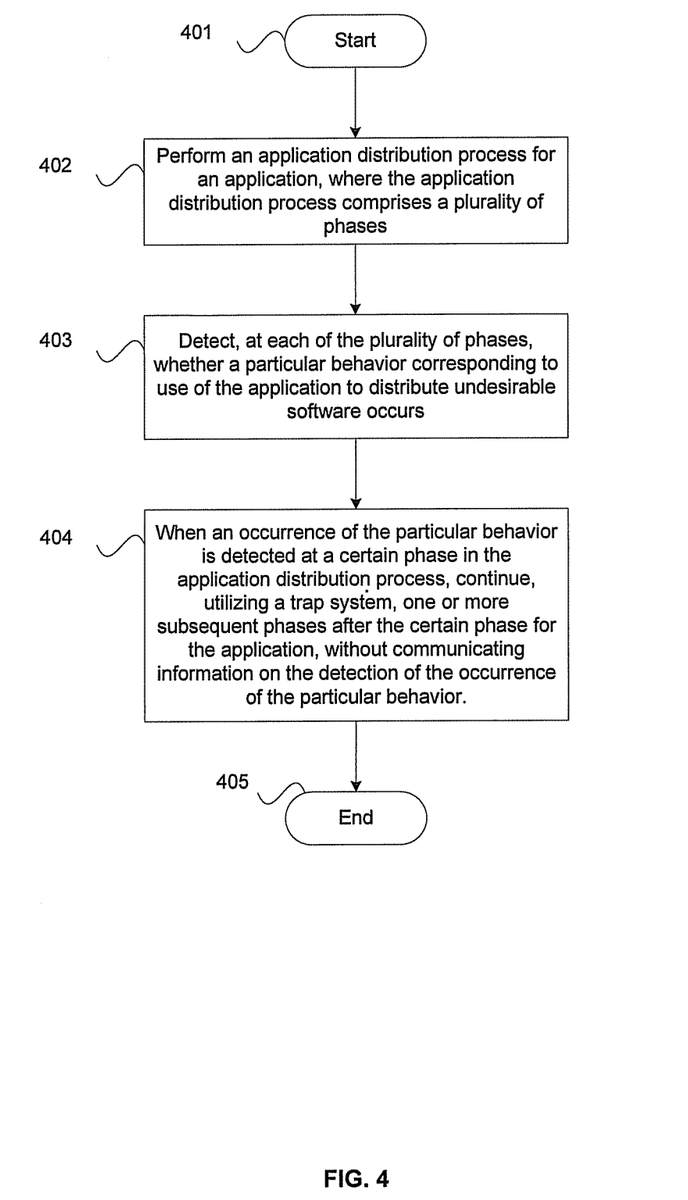
FIG. 4 is a flow chart illustrating example steps for using a honeypot workflow for software review, in accordance with an embodiment of the disclosure.

FIG. 4 is a flow chart illustrating example steps for using a honeypot workflow for software review, in accordance with an embodiment of the disclosure. Referring to FIG. 4, the example steps start at step 401. In step 402, the processor 208 in the application distribution server 102 may be operable to perform an application distribution process 300 for an application such as the application 206a, where the application distribution process 300 may comprise a plurality of phases. For example, the plurality of phases in the application distribution process 300 may comprise, in sequence, a developer account creation phase 302, a risk assessment phase 304, an application upload phase 306, an application publication phase 308, an application promotion phase 310 and an application download phase 312. In step 403, the software detection module 202 in the application distribution server 102 may be operable to detect, at each of the plurality of phases, whether a particular behavior corresponding to use of the application 206a to distribute undesirable software may occur. In step 404, in instances when an occurrence of the particular behavior is detected by the software detection module 202 at a certain phase in the application distribution process 300, the processor 208 may be operable to continue, utilizing a trap system such as a honeypot, one or more subsequent phases after the certain phase for the application 206a, without communicating information on the detection of the occurrence of the particular behavior, for example, to the attacker 104 who may be associated with the application 206a. The example steps may proceed to the end step 405.

In various embodiments of the disclosure, a processor 208 in an application distribution server such as the application distribution server 102 may be operable to perform an application distribution process 300 for an application such as the application 206a, where the application distribution process 300 may comprise a plurality of phases, such as, for example, a developer account creation phase 302, a risk assessment phase 304, an application upload phase 306, an application publication phase 308, an application promotion phase 310 and an application download phase 312 in sequence. A software detection module 202 in the application distribution server 102 may be operable to detect, at each of the plurality of phases, whether a particular behavior corresponding to use of the application 206a to distribute undesirable software may occur. In instances when an occurrence of the particular behavior is detected by the software detection module 202 at a certain phase in the application distribution process 300, the processor 208 may be operable to continue, utilizing a trap system such as a honeypot, one or more subsequent phases after the certain phase for the application 206a, without communicating information on the detection of the occurrence of the particular behavior.

In instances when the occurrence of the particular behavior is detected by the software detection module 202 at the risk assessment phase 304, the processor 208 in the application distribution server 102 may be operable to create a trap account 314 for the application 206a without account blocking, for example. In instances when the occurrence of the particular behavior is detected by the software detection module 202 at the application upload phase 306 and/or at a previous phase prior to the application upload phase 306, the processor 208 may be operable to mark the application 206a, which may have been uploaded to the application distribution server 102, as a trap application 316 without application suspension, for example. In instances when the occurrence of the particular behavior is detected by the software detection module 202 at the application publication phase 308 and/or at a previous phase prior to the application publication phase 308, the processor 208 may be operable to mark the application 206a, which may have been published, as a trap application 318 without application suspension, and prevent the published trap application 318 from being downloaded onto an end-user device such as the end-user device 110a, for example. In instances when the occurrence of the particular behavior is detected by the software detection module 202 at the application promotion phase 310 and/or at a previous phase prior to the application promotion phase 310, the processor 208 may be operable to mark the application 206a which may have been promoted as a trap application 320 without application suspension, and prevent the promoted trap application 320 from being installed in an end-user device such as the end-user device 110a, for example.

The processor 208 in the application distribution server 102 may be operable to allow installation 322 of the promoted trap application 320, for example, in one or more trap end-user devices 330, where the one or more trap end-user devices 330 may be created for the purpose of running the installed trap application 324. In such instances, the software detection module 202 in the application distribution server 102 may be operable to monitor traffic to the application distribution server 102 based on the running of the installed trap application 324 on the one or more trap end-user devices 330. The software detection module 202 may then be operable to determine, based on the monitoring, how the undesirable software may be attempted to be distributed, for example.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for using a honeypot workflow for software review.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
in an application distribution server:
performing, by the server, an application distribution process for an application, wherein the application distribution process comprises a plurality of phases that comprise a developer account creation phase, a risk assessment phase, an application upload phase, an application publication phase, an application promotion phase and an application download phase in sequence;
detecting, at each of the plurality of phases, whether a particular behavior corresponding to use of the application to distribute undesirable software occurs; and
when an occurrence of the particular behavior is detected at a certain phase in the application distribution process, continuing, utilizing a trap system, one or more subsequent phases after the certain phase for the application, without communicating information on the detection of the occurrence of the particular behavior.

2. The method according to claim 1, comprising, when the occurrence of the particular behavior is detected at the risk assessment phase, creating a trap account for the application without account blocking.

3. The method according to claim 1, comprising, when the occurrence of the particular behavior is detected at the application upload phase and/or at a previous phase prior to the application upload phase, marking the application which has been uploaded to the application distribution server as a trap application without application suspension.

4. The method according to claim 1, comprising, when the occurrence of the particular behavior is detected at the application publication phase and/or at a previous phase prior to the application publication phase:
marking the application which has been published as a trap application without application suspension; and
preventing the published trap application from being downloaded onto an end-user device.

5. The method according to claim 1, comprising, when the occurrence of the particular behavior is detected at the application promotion phase and/or at a previous phase prior to the application promotion phase:
marking the application which has been promoted as a trap application without application suspension; and
preventing the promoted trap application from being installed in an end-user device.

6. The method according to claim 5, comprising allowing installation of the promoted trap application in one or more trap end-user devices, wherein the one or more trap end-user devices are created for running of the installed trap application.

7. The method according to claim 6, comprising monitoring traffic to the application distribution server based on the running of the installed trap application on the one or more trap end-user devices.

8. The method according to claim 7, comprising determining, based on the monitoring, how the undesirable software is attempted to be distributed.

9. A system, comprising:
an application distribution server, wherein the application distribution server is configured to:
perform an application distribution process for an application, wherein the application distribution process comprises a plurality of phases that comprise a developer account creation phase, a risk assessment phase, an application upload phase, an application publication phase, an application promotion phase and an application download phase in sequence;
detect, at each of the plurality of phases, whether a particular behavior corresponding to use of the application to distribute undesirable software occurs; and
when an occurrence of the particular behavior is detected at a certain phase in the application distribution process, continue, utilizing a trap system, one or more subsequent phases after the certain phase for the application, without communicating information on the detection of the occurrence of the particular behavior.

10. The system according to claim 9, wherein, when the occurrence of the particular behavior is detected at the risk assessment phase, the application distribution server is operable to create a trap account for the application without account blocking.

11. The system according to claim 9, wherein, when the occurrence of the particular behavior is detected at the application upload phase and/or at a previous phase prior to the application upload phase, the application distribution server is operable to mark the application which has been uploaded to the application distribution server as a trap application without application suspension.

12. The system according to claim 9, wherein, when the occurrence of the particular behavior is detected at the application publication phase and/or at a previous phase prior to the application publication phase, the application distribution server is operable to:
mark the application which has been published as a trap application without application suspension; and
prevent the published trap application from being downloaded onto an end-user device.

13. The system according to claim 9, wherein, when the occurrence of the particular behavior is detected at the application promotion phase and/or at a previous phase prior to the application promotion phase, the application distribution server is operable to:
mark the application which has been promoted as a trap application without application suspension; and
prevent the promoted trap application from being installed in an end-user device.

14. The system according to claim 13, wherein, the application distribution server is operable to allow installation of the promoted trap application in one or more trap end-user devices, where the one or more trap end-user devices are created for running of the installed trap application.

15. The system according to claim 14, wherein the application distribution server is operable to monitor traffic to the application distribution server based on the running of the installed trap application on the one or more trap end-user devices.

16. The system according to claim 15, wherein the application distribution server is operable to determine, based on the monitoring, how the undesirable software is attempted to be distributed.

17. A method, comprising:
in an application distribution server:
performing, by the server, an application distribution process for an application, wherein the application distribution process comprises a plurality of phases, and the plurality of phases comprise a developer account creation phase, a risk assessment phase, an application upload phase, an application publication phase, an application promotion phase and an application download phase in sequence;
detecting, at each of the plurality of phases, whether a particular behavior corresponding to use of the application to distribute undesirable software occurs; and
when an occurrence of the particular behavior is detected at a certain phase in the application distribution process, continuing, utilizing a trap system, one or more subsequent phases after the certain phase for the application, without communicating information on the detection of the occurrence of the particular behavior.

18. The method according to claim 17, wherein, when the occurrence of the particular behavior is detected at the risk assessment phase, the application distribution server is operable to create a trap account for the application without account blocking.

* * * * *